(12) United States Patent
Orlik et al.

(10) Patent No.: US 9,184,876 B2
(45) Date of Patent: Nov. 10, 2015

(54) METHOD AND APPARATUS FOR DETECTING SYMBOLS RECEIVED WIRELESSLY USING PROBABILISTIC DATA ASSOCIATION WITH UNCERTAINTY

(71) Applicant: Mitsubishi Electric Research Laboratories, Inc., Cambridge, MA (US)

(72) Inventors: Philip Orlik, Cambridge, MA (US); Milutin Pajovic, Cambridge, MA (US); Kyeong Jin Kim, Lexington, MA (US); Toshiaki Koike-Akino, Salem, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 47 days.

(21) Appl. No.: 14/183,796

(22) Filed: Feb. 19, 2014

(65) Prior Publication Data

US 2015/0236817 A1    Aug. 20, 2015

(51) Int. Cl.
*H04L 1/00* (2006.01)
*H04L 25/08* (2006.01)

(52) U.S. Cl.
CPC ............ *H04L 1/0052* (2013.01); *H04L 1/0054* (2013.01); *H04L 25/08* (2013.01)

(58) Field of Classification Search
CPC ........................................................ H04L 1/00
USPC ........................................ 375/316, 340, 341
See application file for complete search history.

(56) References Cited

U.S. PATENT DOCUMENTS

| 2008/0292016 | A1 | 11/2008 | Piechocki et al. |
| 2010/0246732 | A1 | 9/2010 | Seo et al. |
| 2011/0069746 | A1 | 3/2011 | Chockalingam et al. |
| 2012/0269233 | A1* | 10/2012 | Hiscock ....................... 375/139 |

OTHER PUBLICATIONS

J. Luo, K. Pattipati, P. Willett, and F. Hasegawa, "Near-optimal multiuser detection in synchronous cdma using probabilistic data association," IEEE Communication Letters, vol. 5, No. 9, 2001.
P. H. Tan and L K. Rasmussen, "Nonlinear MMSE multiuser detection based on multivariate Gaussian approximation," IEEE Transactions on Communications, vol. 54, No. 8, 2006.
Y. Yin, Y. Huang, and J. Zhang, "Turbo equalization using probabilistic data associations," Proceedings of IEEE Globecom, 2004.
Y. Jia, C. Vithanage, C. Andrieu, and R. Piechocki, "Probabilistic data association for symbol detection in MIMO systems," Electronic Letters, vol. 42, No. 1, 2006.

* cited by examiner

*Primary Examiner* — Kevin M Burd
(74) *Attorney, Agent, or Firm* — Dirk Brinkman; Gene Vinokur (57) ABSTRACT

A method detects symbols in a signal received via a wireless channel by generating a statistical model for each symbol, and determining contribution from all other symbols in the signal as an expected interference. The expected interference is subtracted from the signal to obtain an interference-free signal. Then, the symbol is inferred based on the statistical model and the interference-free signal.

10 Claims, 5 Drawing Sheets

Fig. 1

SU-PDA

Require: received signal $z$
Ensure: $p_1, p_2, \ldots, p_N$
Initialize $p_1^{(0)}, \ldots, p_N^{(0)}$
for $i = 1, 2, \ldots, I$ do
　for $n = 1$ to $N$ do
　　$\mu_n = \sum_{k: k \neq n} (2p_k^{(i-1)} - 1) e_k$
　　$\Sigma_n = \sum_k 4 p_k^{(i-1)} (1 - p_k^{(i-1)}) e_k e_k^T$
　　$p_n^{(i)} = \dfrac{\mathcal{CN}(z; e_n + \mu_n, \Sigma_n)}{\mathcal{CN}(z; e_n + \mu_n, \Sigma_n) + \mathcal{CN}(z; -e_n + \mu_n, \Sigma_n)}$
　end for
end for

*Fig. 2*

G-PDA with single Gaussian

Require: received signal $z$
Ensure: $p_1, p_2, \ldots, p_N$
Initialize $p_1^{(0)}, \ldots, p_N^{(0)}$
for $i = 1, 2, \ldots, I$ do
  for $n = 1$ to $N$ do
    $\mu_n = \sum_{k \neq n} (2p_k^{(i-1)} - 1)e_k$
    $\Sigma_n = \sum_{k \neq n} 4p_k^{(i-1)}(1 - p_k^{(i-1)})e_k e_k^T$
    $\mu'_n = \left(1 + e_n^T \Sigma_n^{-1} e_n\right)^{-1} e_n^T \Sigma_n^{-1} (z - \mu_n)$
    $\sigma'^2_n = \left(1 + e_n^T \Sigma_n^{-1} e_n\right)^{-1}$
    $p_n^{(i)} = 0.5 + 0.5 \text{erf}\left(\frac{\mu'_n}{\sqrt{2\sigma'^2_n}}\right)$
  end for
end for

*Fig. 3*

G-PDA with Gaussian mixture

Require: received signal $z$, variance $\sigma_0^2$
Ensure: $p_1, p_2, \ldots, p_N$
Initialize $p_1^{(0)}, \ldots, p_N^{(0)}$
for $i = 1, 2, \ldots, I$ do
  for $n = 1$ to $N$ do
  $\mu_n = \sum_{k \neq n} (2p_k^{(i-1)} - 1)e_k$
  $\Sigma_n = \sum_{k \neq n} 4p_k^{(i-1)}(1 - p_k^{(i-1)})e_k e_k^T$
  $\tilde{z}_n = (e_n^T \Sigma_n^{-1} e_n)^{-1} e_n^T \Sigma_n^{-1}(z - \mu_n)$
  $\sigma^2 = (e_n^T \Sigma_n^{-1} e_n)^{-1}$ ; $\mu_{1,2} = \pm \frac{\tilde{z}_n \sigma_0^2 + \sigma^2}{\sigma^2 + \sigma_0^2}$ ; $\sigma'^2 = \frac{\sigma^2 \sigma_0^2}{\sigma^2 + \sigma_0^2}$
  $w_{1,2} \propto \exp\left(-\frac{(\tilde{z}_n \mp 1)^2}{2(\sigma^2 + \sigma_0^2)}\right)$ , where $w_1 + w_2 = 1$
  $p_n^{(i)} = 0.5\left(1 + w_1 \operatorname{erf}\left(\frac{\mu_1}{\sqrt{2}\sigma'}\right) + w_2 \operatorname{erf}\left(\frac{\mu_2}{\sqrt{2}\sigma'}\right)\right)$
  end for
end for

METHOD AND APPARATUS FOR DETECTING SYMBOLS RECEIVED WIRELESSLY USING PROBABILISTIC DATA ASSOCIATION WITH UNCERTAINTY

FIELD OF THE INVENTION

This invention relates generally to wireless communication, and more particularly to detecting received symbols using probabilistic data association.

BACKGROUND OF THE INVENTION

Machine-to-machine (M2M) communication enables machines to exchange short command and control messages. The main design goal is to achieve fast and highly reliable transmission of short messages over wireless channels with relatively simple devices having a small number of antennas, preferably one or two. One of the major application of M2M is in factories wherein automated production processes benefit when machines can communicate directly with each other wirelessly.

A single-input single-output (SISO) communication system with block transmission and detection is a candidate for M2M. The type of messages should use small block sizes, e.g., less than 100 symbols.

One M2M communication system uses pseudo-random phase precoding (PRPP) and likelihood ascent search (LAS) detection. That scheme performs extremely well in practice when the block size is at least 400 symbols. However, the goal is to greatly reduce the block size without degrading performance.

Maximum likelihood detection (MLD) is an optimal symbol detection scheme. However, the complexity of MLD increases exponentially with the block size. Therefore, a variety of suboptimal detection methods with polynomial complexity have been developed. One of the best known is probabilistic data association (PDA).

PDA was originally developed for radar target tracking and has gained interest in wireless communication applications. As such, PDA has been applied for multiuser detection in code division multiple access (CDMA) systems, turbo equalization, multiple input multiple output (MIMO) systems, and decision feedback equalization (DFE) for detecting symbols transmitted in MIMO systems over a frequency selective channel. A bit-by-bit detection of a higher order quadrature amplitude modulation (QAM) using the PDA method is also known.

SUMMARY OF THE INVENTION

The embodiments of the invention provide a method for detecting symbols in a wireless communication system subject to additive Gaussian noise. Specifically, the method uses probabilistic data association (PDA). PDA uses iterative block detection on a symbol-by-symbol basis, where contributions from other symbols are treated as interference that is approximated as a sum of the interference and the noise with the Gaussian distribution. Thus, the received symbol can be viewed as the desired symbol corrupted with Gaussian noise, which can be inferred using Bayes' rule. However, conventional PDA can converge to an overconfident soft estimate of the symbol after one or two iterations.

The invention is based on the realization that when the overconfident soft estimate implies an erroneous hard estimate for a symbol, as in the prior art, the PDA loses its ability to correct such a symbol in following iterations, and the PDA gets stuck in a local minimum. This characteristic is the driving force for an error floor on the performance at a relatively high signal to noise ratio (SNR), and limits the applicability of PDA to systems that require high reliability, such in machine-to-machine (M2M) communication systems.

Therefore, the embodiments modify the way the symbols are treated by the PDA. The conventional PDA models a symbol as a discrete sample selected from a constellation. In contrast, the PDA with symbol uncertainty (SU-PDA) according to the embodiments treats the symbol as a sum of a deterministic symbol and random noise. The SU-PDA can outperform the conventional PDA by a few dBs on a channel with block fading, and up to and exceeding 10 dB on a channel with fast fading.

Specifically, the symbol is modeled as a sum of a deterministic, unknown variables selected from a finite constellation (alphabet), and a zero mean random variable having a variance equal to a currently estimated variance of the symbol. The random variable expresses the uncertainty in the desired symbol, and the contribution from other symbols is considered as interference. The sum of the random part of the symbol and the system noise is the equivalent additive noise. The distribution of the sum of the interference and the equivalent additive noise is approximated with the Gaussian distribution whose mean and covariance match the mean and covariance of the quantity being approximated. Although the mean of the approximating Gaussian in the method is the same as the mean in the conventional PDA, the covariance, in contrast, depends on the currently estimated variance of the desired symbol.

The PDA with Gaussian approximation method provides relaxation or regularization to the PDA by modeling the symbol with a smooth and continuous statistical distribution, as opposed to a sum of Dirac pulses as in the conventional PDA. This lowers the possibility of getting stuck at a local minimum, and therefore mitigates the error floor problem in the prior art.

The SU-PDA can outperform the conventional PDA for short block sizes, e.g., less than 100 symbols, at lower bit error rates (BERs) in M2M communication systems. Given the equivalence between the SISO system with block transmission and large multiple input multiple output (MIMO) systems the embodiments of the method are equally applicable for symbol detection in large multiple input multiple output (MIMO) systems.

In the following description, boldface uppercase letters denote matrices and boldface lowercase letters denote vectors. An operator $(\ )^T$ denotes transpose, and $(\ )^H$ denotes a complex-conjugation along with transposition, i.e., Hermitian transpose. Unless otherwise specified, all vectors are assumed to be column vectors.

The notation $CN(a,b)$ used herein denotes a complex Gaussian distribution with the first argument a being the mean, and the second argument b being the variance. In addition, we assume that the Gaussian distributions described herein are circularly symmetric. Methods developed in the real domain, as well as the complex domain with non-circular symmetry, are analogous.

DETAILED DESCRIPTION OF THE PREFERRED EMBODIMENT

System Model

Figure 1:
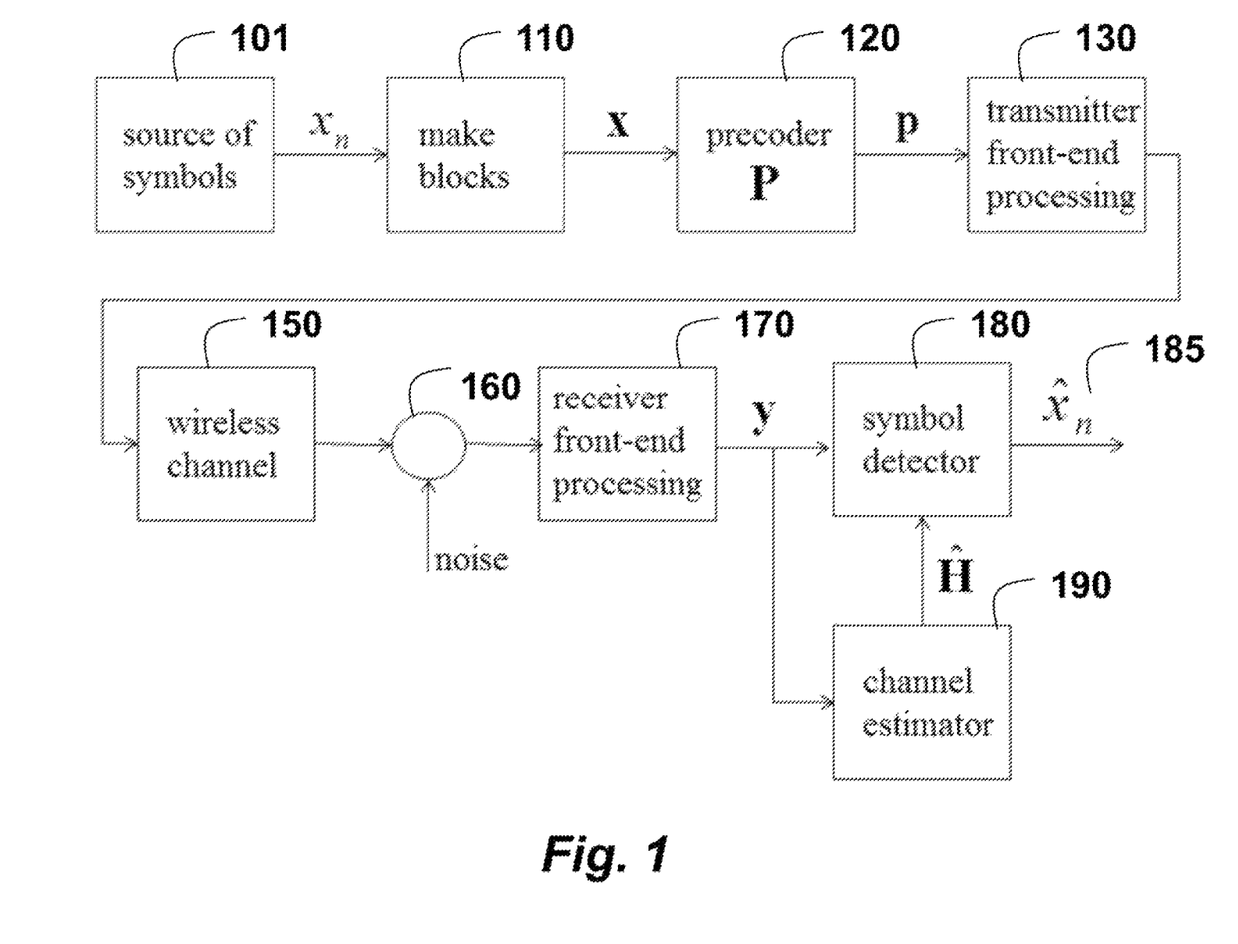
FIG. 1 is a block diagram of a SISO communication system with block transmission and detection according to embodiments of the invention.

FIG. 1 is a block diagram of a SISO communication system with block transmission and detection according to embodiments of our invention. A source 101 can represent information to be transmitted as complex symbols $x_n$. The symbol transmitted at a discrete time n is $x_n \in X$, where X is a finite dimensional symbol constellation. Without loss of generality, we assume that symbol $x_n$ can take any value from the constellation X with equal probability. The consecutive symbols are grouped 110 into blocks of size N so that the transmitted block is $x \in C^{N \times 1}$.

The data block x is processed by a precoder P 120. The precoder essentially spreads the energy of each symbol $x_n$ into N signaling intervals, giving rise to time diversity in the case of a fast fading channel.

Formally, the precoder is described by a precoding matrix $P \in C^{N \times N}$ and its output is given by $$p = Px. \tag{1}$$

The output is passed to a transmitter 130 for front end radio frequency (RF) processing and transmission over a wireless channel 150.

If the wireless channel 150 experiences very slow or block fading, the precoding does not provide sufficient diversity. Formally, in this case, we use the identity precoder, i.e., P=I.

The precoded block p is modulated onto a carrier and transmitted over the wireless channel 150, subject to distortion and noise 160. The signal received by a receiver 170 is filtered, demodulated, converted into the baseband and sampled during front-end RF processing, followed by symbol detection 180 to obtain an estimate of the received symbol $\hat{x}(n)$ 185. The detector receives an estimated channel matrix $\hat{H}$ from the channel estimator 190. The focus of the invention is on the detector 180.

The received baseband signal in discrete time is $y \in C^{N \times 1}$ and is related with the precoded signal p through a linear model, $$y = \sqrt{SNR}Hp + v, \tag{2}$$

where $H \in C^{N \times N}$ models distortions caused by the wireless channel, and SNR is the signal-to-noise ratio. The additive noise is a circularly symmetric zero mean uncorrelated Gaussian process, i.e., $$v \sim CN(0, I),$$

where I is the identity matrix.

The relation between the received signal y and the transmitted block x is obtained by substituting equation (1) into equation (2) such that $$y = Gx + v, \tag{3}$$

where $$G = \sqrt{SNR}HP \tag{4}$$

is the effective channel matrix. We assume the receiver perfectly knows the effective channel matrix G. Therefore, we focus on the symbol detection.

Although derived for the SISO communication system with block detection, equation (3) models the input-output relationship in other communication systems as well. Because the methods described herein do not in particular rely on the additional specifics of the SISO system, they are equally applicable for symbol detection in other communication schemes driven by the model of equation (3), specifically, multiple input multiple output (MIMO) systems.

Probabilistic Data Association

First, we describe the conventional PDA. For simplicity but without loss of generality, the model of equation (3), after multiplication with $G^{-1}$, is expressed as $$z = x + w, \tag{5}$$

where $z = G^{-1}y$. Note that the noise w is a circularly symmetric Gaussian distribution, i.e., $$w \sim CN(0, R)$$

with the covariance $R = (G^H G)^{-1}$.

In essence, the conventional PDA method iteratively calculates the posterior probability of each symbol $x_n$, conditioned on the received signal z, as $$p_n(a) = \mathbb{P}[x_n = a|z], \ a \in X, n = 1, 2, \ldots, N. \tag{6}$$

The method operates as follows. Suppose the method is at iteration i and $x_n$ is the desired current symbol to be detected. The received signal z in equation (5) is expressed as $$z = x_n e_n + \sum_{i \neq n} x_i e_i + w, \tag{7}$$

where $$\{e_i\}_{i=1}^n$$

is the conventional basis, i.e., $e_i$ contains 1 in entry i and zeros elsewhere. The main idea behind the PDA method is to treat the contribution from all other symbols, except the current symbol $x_n$, to the received signal as interference and approximate the sum of the interference and noise with a Gaussian distribution. That is, when detecting $x_n$, the interference plus noise in equation (7)

$$\tilde{w} = \sum_{i \neq n} x_i e_i + w \tag{8}$$

is modeled, as approximately $$CN(\mu_n, \Sigma_n).$$

The mean $\mu_n$ and a covariance matrix $\Sigma_n$ are matched to the mean and covariance of $\tilde{w}$, i.e., $$\mu_n = E[\tilde{w} | z] = \sum_{i \neq n} E[x_i | z] e_i, \text{ and} \tag{9}$$

$$\sum_n = \text{cov}(\tilde{w}, \tilde{w} | z) = \sum_{i \neq n} \text{var}(x_i | z) e_i e_i^T + R \quad (10)$$

In addition, the conventional PDA, assumes that the posterior probabilities of all symbols, except the current symbol $x_n$, determined thus far, are the true posterior probabilities. Thus, the mean $\mu_n$ and covariance $\Sigma_n$ of the approximating Gaussian distribution can be obtained by evaluating the mean $E[x_i|z]$ and variance $\text{var}(x_i|z)$ of a discrete random variable with a known distribution.

Having approximated the statistics of the interference plus noise in equation (7), the distribution of the received signal z conditioned on $x_n=a$ is a complex Gaussian distribution $$p_z | x_n(z | a) = CN\left(z; ae_n + \mu_n, \sum_n\right), a \in X. \quad (11)$$

Therefore, the posterior probability $p_n$ of the symbol $x_n$ can be updated via Bayes' rule $$p_n(a) = \frac{p_z | x_n(z | a)}{\sum_{a' \in X} p_z | x_n(z | a')}, a \in X, \quad (12)$$

where the summation in the denominator is over the constellation X. Note that in equation (12), we exploit the assumption that symbols have uniform prior probabilities.

The conventional PDA method then continues and updates the posterior probability of the next symbol following some prespecified or adaptive ordering scheme. After a termination condition is reached, e.g., a predetermined number of iterations or convergence, the method outputs the estimates of the posterior probabilities $p_n$. Hard estimates $\hat{x}_n$ of the corresponding symbols are obtained using the maximum a posteriori probability (MAP) rule, $$\hat{x}_n = \underset{a \in X}{\text{argmax}} \; p_n(a). \quad (13)$$

PDA with Symbol Uncertainty (SU-PDA) Method

Now we describe our PDA method with symbol uncertainty (SU-PDA). The common feature of the conventional PDA and our SU-PDA is that both use the same model equation (5) (or equation (3)), and infer the posterior distribution $p_n$ of transmitted symbol $x_n$, conditioned on received signal z (or y).

Suppose we are detecting the current symbol $x_n$. The main idea behind the SU-PDA method is to model the symbol $x_n$ as $$x_n = \bar{x}_n + \tilde{x}_n, \quad (14)$$

where $\bar{x}_n$ is a deterministic, unknown variable selected from a finite constellation X, and $\tilde{x}_n$ is a zero mean random variable whose variance is equal to the variance of $x_n$ conditioned on the received signal z and evaluated from the current estimate of $p_n$, $$\text{var}(\tilde{x}_n) = \text{var}(x_n|z). \quad (15)$$

Intuitively, $\tilde{x}_n$ represents the uncertainty in the current knowledge about $x_n$. Substituting equation (14) into equation (7) yields $$z = \bar{x}_n e_n + \tilde{x}_n e_n + \sum_{i \neq n} x_i e_i + w. \quad (16)$$

The contribution to the received signal z from the symbols, other than $x_n$, is treated as interference, while $\tilde{x}_n e_n$ is viewed as an additional noise term. Overall, the distribution of the sum of the interference and noise $$\tilde{w} = \tilde{x}_n e_n + \sum_{i \neq n} x_i e_i + w \quad (17)$$

is approximated with a complex Gaussian distribution with a mean $\mu_n$ and covariance $\Sigma_n$.

As in the conventional PDA, the current estimates of posterior probabilities $\{p_i\}_{i=1}^N$ are used to evaluate the mean and covariance of the approximating Gaussian distribution such that $$\mu_n = E[\tilde{w} | z] = \sum_{i \neq n} E[x_i | z] e_i, \text{ and} \quad (18)$$

$$\sum_n = \text{cov}(\tilde{w}, \tilde{w} | z) = \sum_{i=n}^N \text{var}(x_i | z) e_i e_i^T + R. \quad (19)$$

Note that the mean $\mu_n$ is the same as in equation (9) for the conventional PDA. However, the SU-PDA the summation in the expression for covariance matrix equation (19) includes contributions from all symbols, as opposed to the conventional PDA equation (10), which does not. Given that interference plus noise $\tilde{w}$ is Gaussian distributed, the probability distribution of the received signal z, parameterized by $\bar{x}_n$, is $$p_z(z;\bar{x}_n=a) = CN(z; ae_n+\mu_n, \Sigma_n), a \in X. \quad (20)$$

The SU-PDA updates the posterior probability $p_n$ of $x_n$ by normalizing the parameterized distributions with respect to x. That is, $$p_n(a) = \frac{p_z(z; \bar{x}_n = a)}{\sum_{a' \in X} P_z(z; \bar{x}_n = a')}, a \in X, \quad (21)$$

where the summation in the denominator is over the finite constellation X.

Figure 2:
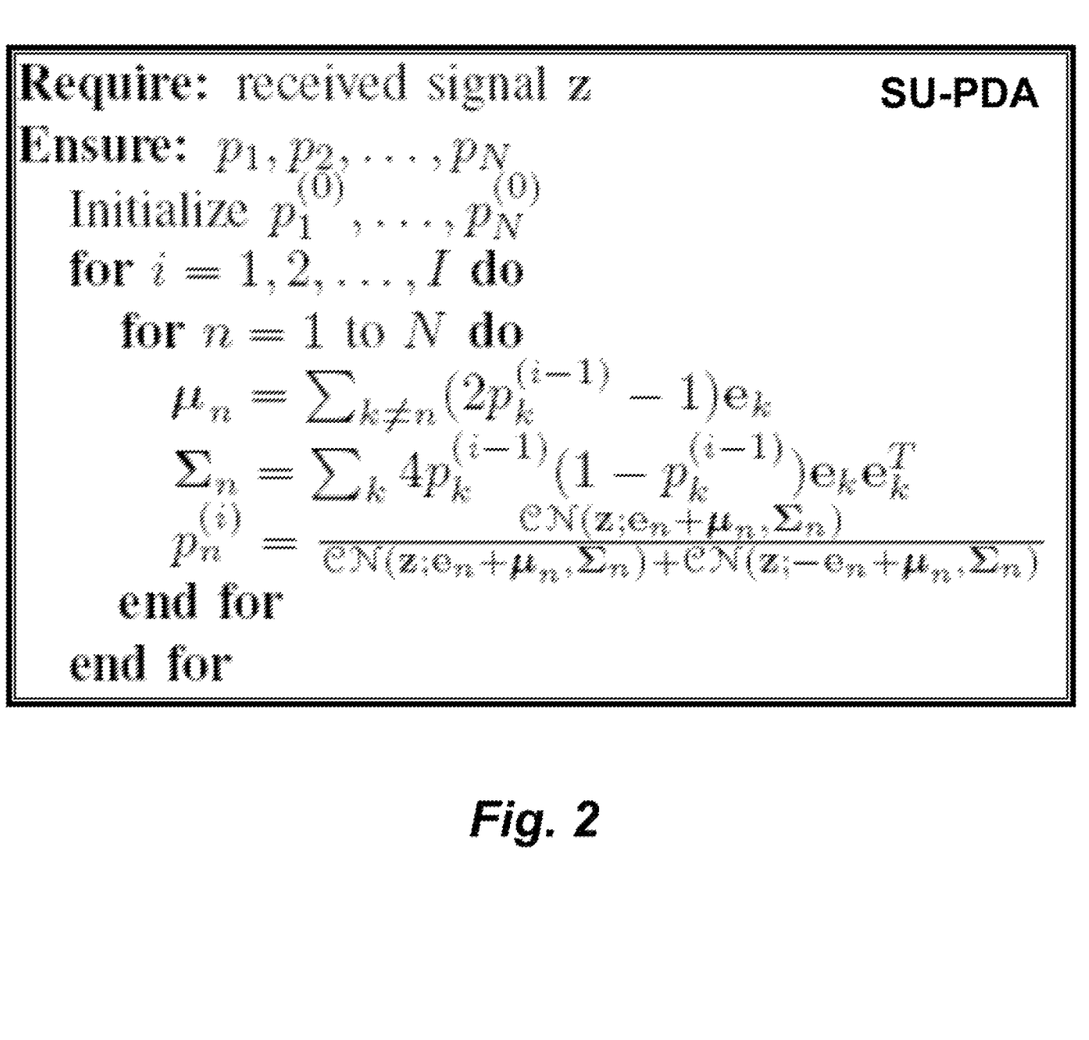
FIG. 2 is a block diagram of pseudo-code for probabilistic data association (PDA) with symbol uncertainty (SU-PDA) according to one embodiment of the invention.
Figure 3:
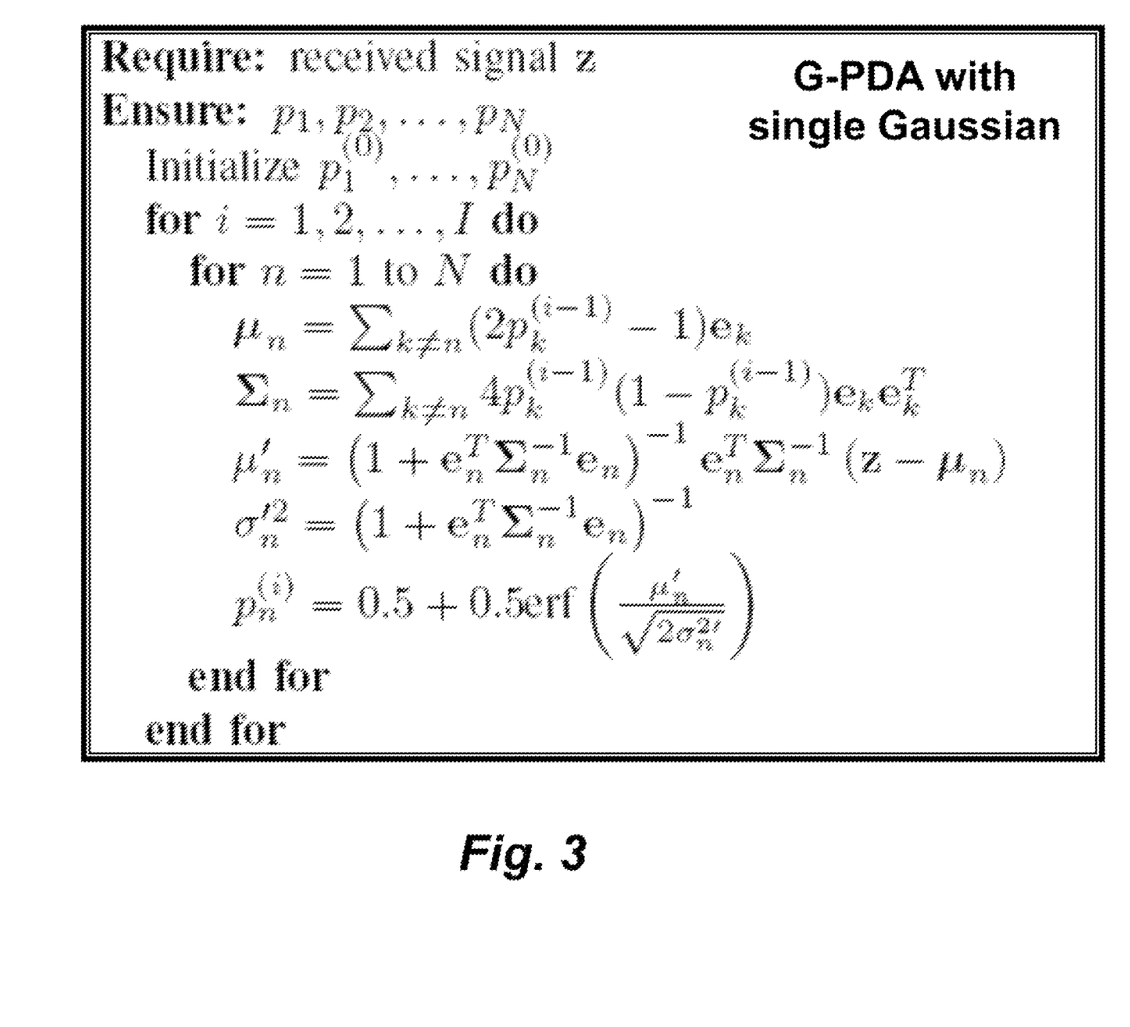
FIG. 3 is a block diagram of pseudo-code for probabilistic data association with a single Gaussian approximation (G-PDA) according to one embodiment of the invention.
Figure 5:
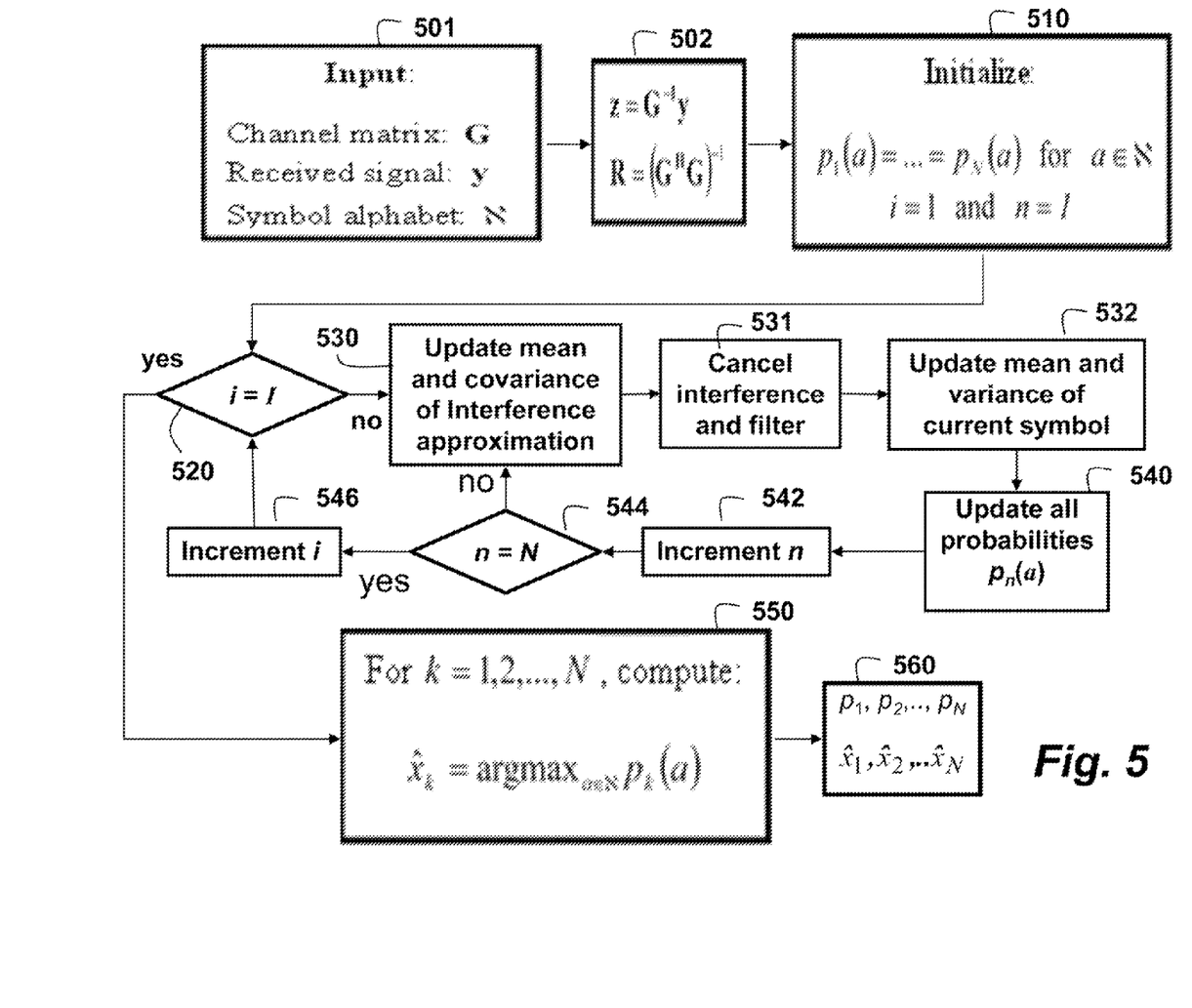
FIG. 5 is a block diagram of method for detecting symbols in a signal received via a wireless channel using probabilistic data association according to embodiments of the invention.

FIG. 2 shows pseudo-code of how the SU-PDA method evaluates the posteriors of binary phase shift keying (BPSK) modulated symbols in a first embodiment (SU-PDA). It is noted that all variables and function in the pseudo code, as well as the pseudo-codes in FIGS. 3 and 5 are described in detail below. The pseudo-codes can be performed in a processor connected to a memory and input/output interfaces by buses as known in the art, specifically a wireless receiver.

Note that the conditional mean in equation (18) and variance in equation (19) of symbol $x_n$ taking values from $X=\{+1,-1\}$ are, respectively, $2p_n^{(i)}-1$ and $4p_n^{(i)}(1-p_n^{(i)})$, where $p_n^{(i)}$ is the estimate of $P\{x_n-1|z\}$ at iteration i. This can be written compactly, since we are assuming BPSK transmissions in FIG. 2, in the form of a likelihood ratio as shown, $$p_n^{(i)} = \frac{CN(z; e_n + \mu_n, \Sigma_n)}{CN(z; e_n + \mu_n, \Sigma_n) + CN(z; -e_n + \mu_n, \Sigma_n)}$$

where, $CN(\cdot)$, denotes the multivariate circularly symmetric complex Gaussian probability density function.

SU-PDA Method Summary

In the basic SU-PDA, the current symbol being detected is modeled as a sum of deterministic, unknown variable taking values from a finite constellation and a zero mean random variable whose variance is equal to a currently estimated variance of the symbol. The random variable represents the uncertainty in our knowledge about the symbol.

The contribution from other symbols to the received signal is considered as interference. The sum of the random part of the symbol being detected and the system noise is the equivalent additive noise. The distribution of the sum of the interference and the equivalent additive noise is approximated with a Gaussian distribution whose mean and covariance match the mean and covariance of the symbol being approximated.

The mean of the approximating Gaussian distribution in the SU-PDA method is the same as the mean in the conventional PDA method. However, the covariance is different from the covariance in the conventional PDA method. In the SU-PDA the covariance depends on the currently estimated variance of the symbol.

The received signal is then modeled as the sum of the desired symbol and the Gaussian distributed random variable with the known mean and covariance. The symbol is inferred from this model using Bayes' rule, and the method iteratively updates the posterior probabilities of the symbols as each symbol is detected.

Advantage of SU-PDA Over Conventional PDA

The conventional PDA method estimates the desired symbol without taking into consideration what the method has learned about that symbol in previous iterations. In contrast, our SU-PDA method models the desired symbol as a deterministic symbol corrupted with noise whose variance is equal to the uncertainty in our knowledge about that symbol.

PDA with Gaussian Approximation (G-PDA)

FIG. 3 shows the pseudo-code for our PDA with a single Gaussian approximation (G-PDA) in a second embodiment. G-PDA starts with the model as in equation (5) and updates the posterior probabilities $p_n$. As in the conventional PDA, the contribution of other symbols to the received signal $z$ is viewed as interference. The distribution of the interference plus noise $\hat{w}$ is approximated with a complex Gaussian distribution with the mean and covariance matrix, evaluated as in equation (9) and equation (10).

In the first step of the G-PDA method, the expected value of the interference is subtracted from the received signal. Because the noise w has zero mean, the expected value of the interference is $\mu_n$ and the interference-free signal is $$\tilde{z} = z - \mu_n. \tag{22}$$

The interference-free signal $\tilde{z}$, using equation (5), is modeled as $$\tilde{z} = x_n e_n + q, \tag{23}$$

where q is the equivalent noise, given by $$q = \sum_{i \neq n} x_n e_n - \mu_n + w. \tag{24}$$

Note that $q \sim CN(0, \Sigma_n)$, where $\Sigma_n$ is evaluated using equation (10).

In the second step of our G-PDA method, the signal $\tilde{z}$ in equation (23) is processed with the minimum mean square error (MMSE) filter to estimate the symbol $x_n$. The impulse response of the MMSE filter is given in vector form by $$w_{MMSE} = (e_n e_n^T + \Sigma_n)^{-1} e_n. \tag{25}$$

The output from the MMSE filter is scaled and a sufficient statistic $\tilde{z}_0$ is given by $$\tilde{z}_o = \frac{w_{MMSE}^H \tilde{z}}{e_n^T (e_n e_n^T + \Sigma_n)^{-1} e_n}. \tag{26}$$

Substituting equation (25) into equation (26) and using the matrix inversion lemma for the inverse of the rank one update of a matrix yields $$\tilde{z}_o = \frac{e_n^T \Sigma_n^{-1}}{e_n^T \Sigma_n^{-1} e_n} \tilde{z}. \tag{27}$$

Substituting equation (23) into equation (27), yields a simple model for $\tilde{z}_0$ $$\tilde{z}_0 = x_n + \tilde{q}, \tag{28}$$

where $\tilde{q} \sim CN(0, \sigma^2)$. The variance $\sigma^2$ is evaluated as $$\sigma^2 = \frac{1}{e_n^T \Sigma_n^{-1} e_n}. \tag{29}$$

In the final step, the symbol $x_n$ is detected from $\tilde{z}_0$ using the model in equation (28). It can be confirmed that if $x_n$ is modeled as a uniform discrete random variable over the constellation X, the conventional PDA method is obtained. Depending on how the distribution of the symbol $x_n$ is modeled, we provide two embodiments of G-PDA.

Modeling $x_n$ with a Single Gaussian Random Variable

In this embodiment, we model $x_n$ as a single Gaussian random variable whose mean and variance match the mean and variance of $x_n$. Because $x_n$ is a point from a finite constellation, without loss of generality, $$\tilde{p}x_n(x) = CN(x; 0, 1). \tag{30}$$

Hence, given that both $x_n$ and $\tilde{q}$ in equation (28) are Gaussian distributed scalars, the posterior probability of $x_n$ conditioned on $\tilde{z}_0$ (and therefore on z because $\tilde{z}_0$ is a sufficient statistics) is also Gaussian distributed, i.e., $$\tilde{p}x_n|\tilde{z}_0(x|\tilde{z}_0) = CN(x; \mu'_n, \sigma'^2_n), \tag{31}$$

where the mean and variance are, respectively, given by $$\mu'_n = \frac{\tilde{z}_o}{1+\sigma^2} \text{ and } \sigma'^2_n = \frac{\sigma^2}{1+\sigma^2}. \quad (32)$$

After substituting equation (27) and equation (29) into equation (32), the mean and variance of the a posteriori Gaussian distribution are given by $$\mu'_n = \frac{e_n^T \sum_{n}^{-1}(z-\mu_n)}{1+e_n^T \sum_{n}^{-1} e_n} \text{ and } \sigma'^2_n = \frac{1}{1+e_n^T \sum_{n}^{-1} e_n}. \quad (33)$$

Thus, we arrive at the update equations for the mean $\mu'_n$ and variance $\sigma'^2_n$ of the current symbol being detected, $x_n$, in our "G-PDA with single Gaussian" method. These are shown in FIG. 3 as the third and fourth equations in the the inner most loop. What remains is updating the posterior probability $p_n(a)$, that is the probability that the $n^{th}$ symbol is a, where a is any of the possible constellation points in the transmitter's modulation alphabet. The posterior probability $p_n(a)$ is updated by integrating the Gaussian distribution of the mean, $\mu'_n$, and variance, $\sigma'^2_n$, over region $z(a)$ in a complex plane, which is defined as the set of points that are closer in the Euclidean sense to the constellation point $x=a$ than to any other constellation point from X. Formally, we have $$p_n(a) = \int_{Z(a)} \tilde{p}_{x_n} \big| \tilde{z}_o(x|\tilde{z}_o) dx, \quad (34)$$

where $$Z(a) = \{z \mid \|z-a\| < \|z-a'\|, a' \in X\}. \quad (35)$$

Thus, for BPSK modulated symbols where the modulation alphabet is $X=\{+1,-1\}$, $$z(1) = \{z \in R | z > 0\},$$

and thus, the posterior probability $p_n(1)$ is updated with the probability that a random variable distributed according to equation (31) is positive. Hence, $$p_n(x_n = 1) = \mathbb{P}[N(\mu'_n, \sigma'^2_n) > 0] = \frac{1}{2} + \frac{1}{2} \text{erf}\left(\frac{\mu'_n}{\sqrt{2\sigma'^2_n}}\right), \quad (36)$$

where the error function (erf) is defined as $$\text{erf}(x) = \frac{2}{\sqrt{\pi}} \int_0^x e^{-t^2} dt, \quad (37)$$

as shown in the final update equation in FIG. 3.

Modeling $x_n$ with a Gaussian Mixture

Figure 4:
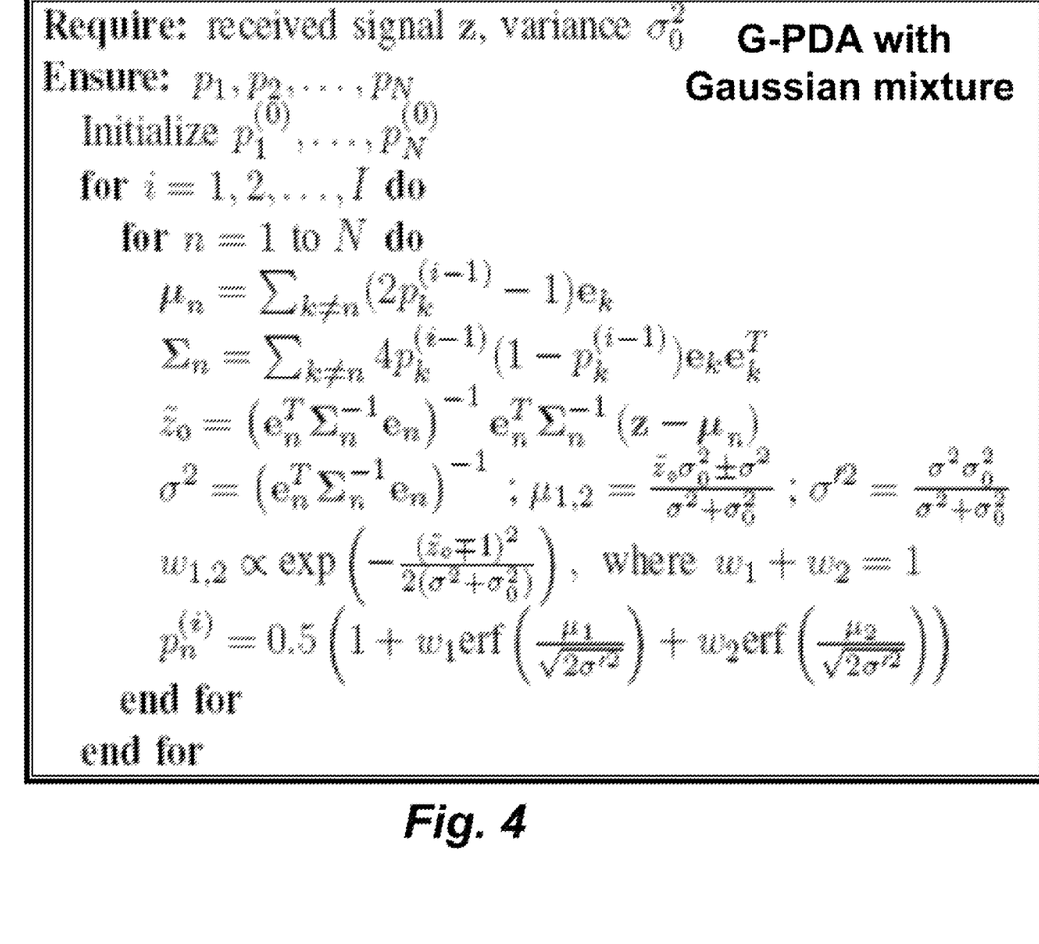
FIG. 4 is a block diagram of pseudo-code for probabilistic data association with Gaussian mixture updates according to one embodiment of the invention.

FIG. 4 shows a pseudo-code description of how the G-PDA method with a Gaussian mixture updates and evaluates the posterior probabilities of BPSK symbols.

In this embodiment of the G-PDA, we assume the prior probaility on $x_n$ is a mixture of Gaussian distributions whose components have means taking values from the transmitter's constellation X, the same variance $\sigma_0^2$ and equal weights. Formally, $$\tilde{p}_{x_n}(x) = \frac{1}{|X|} \sum_{a \in X} CN(x; a, \sigma_0^2), \quad (38)$$

where the variance $\sigma_0^2$ is a parameter that can be adjusted. The posterior probability of $x_n$ is, using the Bayes' rule, a Gaussian mixture.

As an example, we consider BPSK modulation in FIG. 4, where $X=\{+1,-1\}$. For each symbol in the block (n=1, 2, . . . , N), we first update the mean and covariance, using most recent estimates of the posterior probabilities of all other symbols. This is done via the regular PDA method described in equations (9) and (10). For BPSK, we can simplify equations (9) and (10) for the mean and covariance matrix to the following as shown in FIG. 4, $$\mu_n = \sum_{k=n} (2p_k^{(t-1)} - 1)e_k, \text{ and}$$

$$\Sigma_n = \sum_{n=k} 4p_k^{(t-1)}(1-p_k^{(t-1)})e_k e_k^T.$$

Following the aforementioned updates, the decision statisic for the current symbol is computed according to EQUATION (27) and for BPSK we have $$z'_0 = [\Sigma_m^{-1} e_n)^{-1} e_n^T (z - \mu_n).$$

The distribution of $x_n$ conditioned on $\tilde{z}_0$, and thus on z, is, using the Bayes' rule, given by $$\tilde{p}x_n|z(x|z) = w_1 CN(x; \mu_1, \sigma'^2) + w_2 CN(x; \mu_2, \sigma'^2), \quad (39)$$

where $$\mu_{1,2} = \frac{\tilde{z}_o \sigma_0^2 \pm \sigma^2}{\sigma^2 + \sigma_0^2} \text{ and } \sigma'^2 = \frac{\sigma^2 \sigma_0^2}{\sigma^2 + \sigma_0^2}, \quad (40)$$

while the weights are $$w_{1,2} \propto \exp\left(-\frac{(\tilde{z} \mp 1)^2}{2(\sigma^2 + \sigma_0^2)}\right) \text{ where } w_1 + w_2 = 1. \quad (41)$$

Thus the means $\mu_{1,2}$, variances $\sigma'^2$ of the Gaussian mixture probabilities in equation (39) are compute by equation (40) and the mixture weights can be computed according to (41). This embodiment of the G-PDA with Gaussian mixture, which does not update the weights $w_1$ and $w^2$ i.e., it keeps the weights equal, can be referred to as G-PDA with partial update.

The posterior probability $p_n(a)$ is updated by integrating the Gaussian mixture $\tilde{p}x_n|z(x|z)$, as in equation (34), over the complex region $Z(a)$, defined in equation (35). For BPSK modulation, we obtain $$p_n(1) = 0.5\left(1 + w_1 \text{erf}\left(\frac{\mu_1}{\sqrt{2\sigma'^2}}\right) + w_2 \text{erf}\left(\frac{\mu_2}{\sqrt{2\sigma'^2}}\right)\right). \quad (42)$$

After the posterior probability $p_n$ of a symbol $x_n$ is updated, the SU-PDA and G-PDA update the posterior probability of the next symbol from a selected ordering, and when a termination condition is reached, e.g., a certain number of iterations or convergence, the method outputs the final estimates of the posterior probabilities and hard estimates of the transmitted symbols obtained using the MAP rule equation (13).

Method for Detecting Symbols

FIG. 5 is a flow diagram of the generl method for detecting symbols received via a wireless channel using probabilistic data association. The general method requires the received signal vector y, the equivalent channel matrix G, which is typically estimated using pilot signals prior to the transmission of data, as well as the symbol/modulation alphabet, as shown in block 501. In block 502, we process y to obtain a vector $z=G^{-1}y$, which may be viewed as our initial estimate about the transmitted symbols and we also determine the covariance matrix, $R=(G^H G)^{-1}$. In block 510, we initialize the posterior probabilities p(a), for all possible modulation symbols. The initial posterior probabilities are typically set to a uniform distribution over the modulation alphabet, but other distributions may be used. Additionally, we set the block size, N, and the number of PDA iterations, I.

In block 520, we determine if we are done, i.e., we have reached the maximum number of PDA iterations set in block 510, and if true, then we proceed to BLOCK 550 to estimate the symbol $\hat{x}$ using the maximum a posteriori probability (MAP) rule, and output 560 the detected symbols along with their posterior probabilies.

If not done, then in block 530, we update, for each symbol in the block, the mean and covariance matrix of the Gaussian approximation of the interference. Recall that these are computed according to equations (9) and (19) respectively. If we are using a G-PDA detector, then we cancel in block 531 the expected interference from other symbols in the block according to equation (22), process the result with the scaled MMSE filter to obtain equation (28). The obtained result is used to update the mean and variance of the current symbol in 532. This is done via equation (32) when the current symbol is modeled as a single Gaussian, distribution or through equation (40) if we are modeling the current symbol as a Gaussian mixture. In step 540, after the update of the mean and variance of the current symbol the posterior probabilities are recomputed according to equation (21) for SU-PDA or equations (36) and (42) for G-PDA detectors. The detector increments n in block 542 and repeats the steps in blocks 530, 531, 532, 540 for the next symbol. If all symbols (n=1, 2, . . . , N) have been processed, then the detector increments in 546 the iteration counter i, and reprocesses the block with the updated set of probabilities, $p_n(a)$. We note that for the SU-PDA variants the blocks 531 and 532 are not required and after the interference mean and covariance matrix update 530, the posterior probabilities can be updated directly.

G-PDA Method Summaries

In the G-PDA methods, the contribution of the symbols, other than the desired symbol, to the received signal is viewed as interference and modeled as a random variable whose distribution is approximated with a Gaussian distribution. The mean and covariance of the approximating Gaussian distribution are equal to the mean and covariance of the value being approximated.

The mean of the interference is subtracted from the received signal. The interference-free signal is processed through a MMSE filter to estimate the symbol. The MMSE filter output is scaled. The sufficient statistics of the symbol obtained this way are then treated as the sum of the desired symbol and Gaussian distributed noise whose variance is evaluated from the covariance of the interference and the impulse response of the MMSE filter. The sufficient statistics are then used to estimate the desired symbol. The desired symbol is modeled as a sample from a continuous distribution. Depending on a particular distribution, the following embodiments are described.

Single Gaussian

The distribution of the desired symbol is approximated with a Gaussian distribution having a mean and a variance equal to the mean and variance of a corresponding transmitted symbol. Because the additive noise in the model for sufficient statistics is Gaussian distributed, the posterior probability is also Gaussian distributed. Because the desired symbol is discrete, the posterior probability of the desired symbol at a particular constellation point instantiation is updated by integrating the Gaussian posterior probabilities over a region in a complex plane that corresponds to the constellation point.

Gaussian Mixture

The distribution of the desired symbol is approximated with a Gaussian mixture, which contains a Gaussian component around each point in the constellation. The variances of all components are equal and set to some pre-specified value. All Gaussian components are weighted equally.

Given that the noise in the model for sufficient statistics is Gaussian distributed, the posterior probability is also a mixture of Gaussian distributions with the updated weights, means and variances. In general, the updated variances remain equal, while the updated weights and means are different.

The posterior probability of the desired symbol at a particular constellation point is obtained by integrating the posterior probability of the Gaussian mixture over the region corresponding to that constellation point.

Gaussian Mixture with Updates

This method is similar to the above method. The only difference is in that the weights in the posterior Gaussian mixture are not updated, and are thus kept equal.

Advantage over the Conventional PDA

The symbol to be estimated is, in general, uniformly distributed over a finite constellation and the conventional PDA method exploits this fact.

In contrast, our methods model the desired symbol as a continuous random variable. The approximating continuous distribution either matches the mean and variance, in the single Gaussian method, or resembles the shape of the mixture of the true distribution. This turns out to be sufficient for our methods to perform at relatively low SNR, at most slightly worse than the conventional PDA method.

More importantly, our methods inherently bring relaxation (also known as regularization) to the conventional PDA method. By modeling the desired symbol with smooth and continuous statistical distributions, as opposed to modeling with the sum of Dirac pulses, soft information of the desired symbol tends not to be overconfident as in the conventional PDA method. This lowers the possibility of getting the detector stuck at local minimum, and therefore mitigates the error floor problem.

The selected distributions (a single Gaussian or a Gaussian mixture) enable tractable and simple inference on the desired symbol.

Effects of the Invention

The PDA method can provide good performance in symbol detection and interference cancellation in a variety of communication techniques. One such application is symbol detection in a SISO system with block transmission and detection. That technique can provide fast and highly reliable transmission of short messages over wireless channels. These requirements constitute design goal for M2M communication system.

The imbodiments of the invention provide PDA methods that outperform the conventional PDA method for short blocks (<100) symbols) and at SNR's corresponding to BER's required for M2M communications.

Our PDA methods differ from the prior art PDA in the way a symbol is estimated. As such, the SU-PDA models such a symbol as a sum of a discrete deterministic variable and zero mean noise, which represents the uncertainty in our knowledge about that symbol. The G-PDA method models the symbol as a random variable distributed, either as a single Gaussian distribution, or a mixture of Gaussian distributions.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting symbols in a signal received via a wireless channel, comprising for each symbol to be detected:
   generating a statistical model for each symbol, wherein the symbol is approximated with a Gaussian distribution having a mean and a variance are equal to the mean and variance of a corresponding transmitted symbol, and wherein components of the Gaussian distribution are weighted equally;
   determining contribution from all other symbols in the signal as an expected interference;
   subtracting the expected interference from the signal to obtain an interference-free signal; and
   inferring the symbol based on the statistical model and the interference-free signal, wherein the steps are performed in a receiver.

2. The method of claim 1, wherein the inferring uses Bayes' rule.

3. The method of claim 1, wherein the model is a smooth and continuous statistical distribution.

4. The method of claim 1, wherein the model is a single Gaussian random variable.

5. The method of claim 1, wherein the model is a mixture of Gaussian distributions.

6. The method of claim 1, wherein the model is a sum of a deterministic, unknown variable taking values from a finite constellation and a zero mean random variable, wherein the zero mean random variable has a variance equal to an estimated variance of the symbol, and wherein the sum is approximated with a Gaussian distribution having a mean and covariance equal to a mean and covariance of the symbol.

7. The method of claim 1, wherein a posterior probability of the symbol at a particular constellation point instantiation is updated by integrating the Gaussian posterior probabilities over a region in a complex plane that corresponds to the constellation point.

8. The method of claim 1, wherein weights of components of the Gaussian distribution are updated after detecting each symbols.

9. The method of claim 1, wherein the receiver is part of a single-input single-output communication system with block transmission and detection.

10. The method of claim 1, wherein the model for the symbol $x_n$ is $$x_n = \bar{x}_n + \tilde{x}_n,$$

where $\bar{x}_n$ is a deterministic, unknown variable selected from a finite constellation X, and $\tilde{x}_n$ is a zero mean random variable whose variance is equal to the variance of $x_n$ conditioned on the received signal.